(12) United States Patent
Palmer

(10) Patent No.: US 12,734,700 B2
(45) Date of Patent: Sep. 15, 2026

(54) ROBOTIC APPARATUS FOR ASSISTANCE IN A WORKSPACE

(71) Applicant: Marvin T. Palmer, Spring Valley, CA (US)

(72) Inventor: Marvin T. Palmer, Spring Valley, CA (US)

( * ) Notice: Subject to any disclaimer, the term of this patent is extended or adjusted under 35 U.S.C. 154(b) by 283 days.

(21) Appl. No.: 18/597,200

(22) Filed: Mar. 6, 2024

(65) Prior Publication Data

US 2024/0300111 A1 Sep. 12, 2024

Related U.S. Application Data

(60) Provisional application No. 63/450,213, filed on Mar. 6, 2023.

(51) Int. Cl.

| | |
|---|---|
| ***G06F 3/16*** | (2006.01) |
| ***B25J 9/00*** | (2006.01) |
| ***B25J 9/16*** | (2006.01) |
| ***B25J 11/00*** | (2006.01) |
| ***B25J 18/02*** | (2006.01) |

(52) U.S. Cl.
CPC ........... *B25J 9/1697* (2013.01); *B25J 9/0087* (2013.01); *B25J 9/163* (2013.01); *B25J 11/008* (2013.01); *B25J 18/02* (2013.01)

(58) Field of Classification Search
CPC ........ B25J 9/0087; B25J 9/163; B25J 11/008; B25J 18/02; B25J 5/007
See application file for complete search history.

(56) References Cited

U.S. PATENT DOCUMENTS

| | | | | |
|---|---|---|---|---|
| 2008/0136904 | A1* | 6/2008 | Calsina | B63B 59/08 348/E7.086 |
| 2009/0118865 | A1* | 5/2009 | Egawa | B25J 19/023 901/47 |
| 2019/0184572 | A1* | 6/2019 | Hayashi | G05D 1/686 |
| 2021/0169422 | A1* | 6/2021 | Mashaw | A61B 5/02055 |

* cited by examiner

*Primary Examiner* — Muhammad S Islam
(74) *Attorney, Agent, or Firm* — Patent 360; Barry Choobin

(57) ABSTRACT

A robotic apparatus for use in a workplace for monitoring and moving items or objects from one place to another. The robotic apparatus includes a robotic body; a base over which the robotic body is mounted, the base has a plurality of wheels to allow the robotic apparatus to move and rotate; a robotic head; an extensible neck that extends between the robotic body and the robotic head, a pair of robotic arms coupled to the robotic head, wherein each robotic arm has a robotic hand; and a plurality of cameras disposed in the robotic head. The robotic apparatus can increase or decrease the effective length of the extensible neck. The robotic head is rotatably mounted to the extensible neck. The plurality of cameras supports computer vision.

8 Claims, 3 Drawing Sheets

ROBOTIC APPARATUS FOR ASSISTANCE IN A WORKSPACE

CROSS-REFERENCE TO RELATED APPLICATIONS

This application claims priority from a U.S. provisional patent application Ser. No. 63/450,213 filed on Mar. 6, 2023, which is incorporated herein by reference in its entirety.

FIELD OF INVENTION

The present invention relates to a robotic apparatus for assistance in a workspace, and more particularly, the present invention relates to a robotic apparatus that can do laborious work in a workspace and also act as a security guard.

BACKGROUND

In office workspaces, moving items from one place to another is a common task. Depending upon the type of work, different items are moved from one place to another. For example, it is common in most offices that files and equipment need to be handled from one person to another or from one place to another. Moreover, a need often arises for creating additional cubicles in the office workspace. The additional manpower for such laborious tasks often results in increased operation costs. Also, such a task has an inherent safety risk, such as accidents may happen while carrying a load. Moreover, suitable people for carrying out the task may not be available readily.

A need is therefore appreciated for a robotic apparatus specially designed for workspaces.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a robotic apparatus for office workplaces.

It is another object of the present invention that the robotic apparatus can handle laborious tasks.

It is still another object of the present invention that the robotic apparatus acts as a security guard.

It is yet another object of the present invention that robotic apparatus can safely transfer items from one place to another within the office and outside the office.

It is a further object of the present invention that the robotic apparatus has multiple cameras to visualize the office space.

It is still a further object of the present invention that the robotic apparatus is easy to deploy.

It is yet a further object of the present invention that the robotic apparatus can facilitate large-scale office cubical buildup, reconfiguration, and relocation process.

It is an additional object of the present invention that the robotic apparatus is ideal for commercial building owners, moving companies, furniture dealerships, furniture manufacturers, high-security facilities, and military bases.

It is still an additional object of the present invention that the robotic apparatus allows for audio and video conferencing.

It is yet an additional object of the present invention that the robotic apparatus can monitor a job site.

In one aspect, disclosed is a robotic apparatus comprising a robotic body; a base over which the robotic body is mounted, the base has a plurality of wheels configured to allow the robotic apparatus to move and rotate; a robotic head; an extensible neck extending between the robotic body and the robotic head, the robotic apparatus is configured to increase or decrease the effective length of the extensible neck, wherein the robotic head is rotatably mounted to the extensible neck; and a pair of robotic arms coupled to the robotic head, wherein each robotic arm has a robotic hand.

In one aspect, the robotic apparatus further comprises a plurality of cameras disposed in the robotic head, the plurality of cameras support computer vision. The plurality of cameras comprises two to four cameras, the two to four cameras equally spaced apart from each other.

In one aspect, the robotic apparatus further comprises a control unit, the control unit comprises one or more processors and memory, and the control unit is configured to artificial intelligence, computer vision, and building automation system (BAS) technologies. The control unit is also configured with a building plan and layouts of a workplace. The robotic apparatus may also support barcode technologies for navigating in a building. The barcodes can be used in combination with building blueprints to move within a workspace.

In one aspect, the robotic apparatus further comprises a front display mounted to the front side of the robotic body; and a front input device mounted to the front side of the robotic body. The robotic apparatus further comprises a rear display mounted to a rear side of the robotic body, and a rear input device mounted to the rear side of the robotic body. The display is an LED monitor. Each of the front input device and the rear input device comprises a keyboard. The robotic apparatus further comprises a call receiver unit mounted adjacent to the front display.

In one aspect, the robotic apparatus is configured to lift an object by the robotic hands, transport the object, and place the object. The object comprises office equipment.

BRIEF DESCRIPTION OF DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
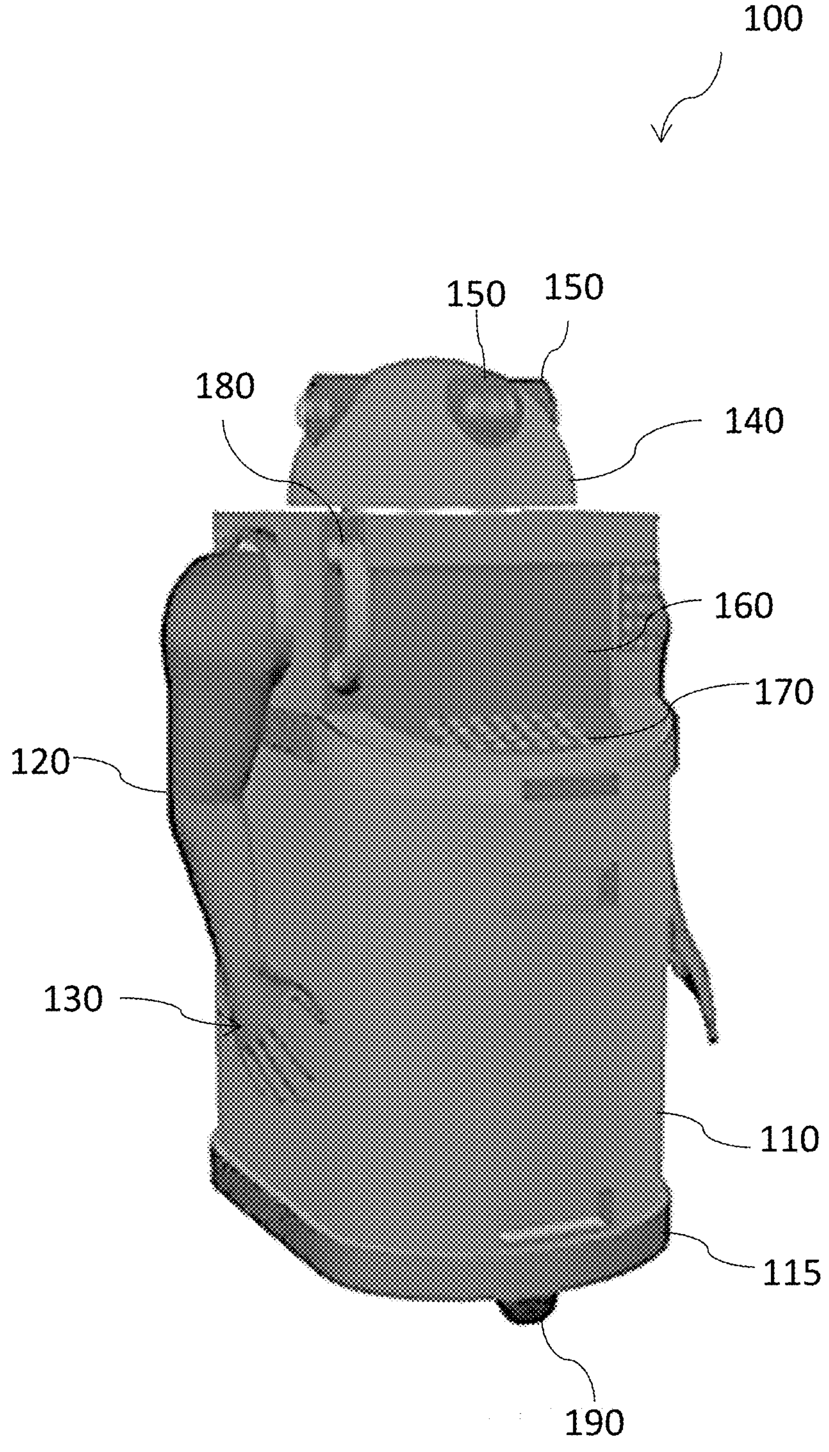
FIG. 1 is a front and side perspective view of the robotic apparatus, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

Disclosed is a robotic apparatus for office workspaces that can handle the moving of items between places and also facilitate the security of the workplace. The robotic apparatus can move and rotate on the floor and has two hands to hold objects. The robotic apparatus includes a head coupled to a body through an extendible neck. The head has four cameras that allow visualizing 360 views of the surroundings. The use of at least two cameras may allow the robotic apparatus to have a stereo vision. Using computer vision and multiple cameras, the robotic apparatus can recognize surrounding objects and track movements of the any object. The disclosed robotic apparatus can track the movements of a face, such as that of eyes and lips. This way the robotic apparatus may understand human behavior, emotions, and the like. By tracking the movement of lips, the robotic apparatus may also provide for lip reading.

The robotic apparatus can extend its neck for lifting the head to a predefined distance for a better view, such as viewing across a cubicle or inside a cubicle. The robotic apparatus has a front display with an input device mounted on the front side of the robotic apparatus and a rear display with an input device mounted on the rear side of the robotic apparatus. The front display and the rear display allow a user to interact with the disclosed apparatus or with another user through the disclosed apparatus. The input device can be a keyboard for receiving input from the user. A call receiver can also be provided for audio and/or video conferencing.

The robotic apparatus can autonomously handle tasks in the workspace. Also, the robotic apparatus can act under supervision following the instructions given to it. The disclosed robotic apparatus can be programmed using artificial intelligence (AI) and building automation system (BAS) technologies for automation and safety. The building plan and layout can be programmed into the robotic apparatus and any changes in the layout can be dynamically updated. The layout of furniture, cubicles, equipment, and like in a workspace can be configured and dynamically updated. Moreover, new layouts can be programmed to create new cubicles or changes in the workspace. Also, other techniques such as barcode technologies can be used for indoor navigation. The barcodes include QR codes or any other machine-readable codes. More than one navigation technology can be used, for example, Barcodes and building blueprints can be used for indoor navigation. When the barcode navigation is not available, the robotic apparatus can use the building blueprints only.

The robotic apparatus can also be programmed with details of personnel authorized to use the workspace. Thus, the disclosed robotic apparatus can differentiate between authorized and unauthorized persons. The robotic training apparatus can also take attendance and track time spent at a place by an employee. Unlike fixed security cameras installed in a building that has limited coverage, the disclosed robotic apparatus can roam around and cover any blind spots. Moreover, the disclosed robotic apparatus can be programmed to behave cordially with people interacting with the disclosed robotic apparatus helping to better manage the workplace.

The disclosed apparatus can be particularly useful for large-scale workspaces, wherein the disclosed apparatus can hugely save operational costs. The disclosed apparatus can also be very useful for high-security facilities, being a trusted assistant. The disclosed robotic apparatus can monitor the area for suspicious activity or the presence of any unauthorized person.

The disclosed robotic apparatus can work in synchronization with other robotic apparatuses as a team. The size of the team may depend upon the size of the workplace, for example, a small workspace may require only one robotic apparatus, while larger workspaces may require more, like 12 robotic apparatuses. Moreover, for new projects, the number of robotic apparatuses required may vary depending on the complexity of the project. A human supervisor can control and coordinate the team working on the project. For example, in creating a complete office unit, the disclosed robotic apparatuses can work as a team with human workers to complete the more subjective tasks, such as moving computers, printers, copy machines, telephones, etc. A key advantage of the robotic build and moving process for facilities would be the utilization of robotic unit designs that would be capable of handling much heavier office cubicle components versus that of a human worker without tiring or the potential for serious worker injury and related medical cost. The team can work quickly and efficiently, thus saving both time and cost. New layouts or changes in layouts can be instantly executed and conveyed to the team. It is understood that moving the items is only one application of the disclosed robotic apparatus either alone or in a team of robotic apparatuses, the disclosed apparatus can be employed in a variety of tasks, such as security, material handling, assistance in emergency situations, and the like.

With the disclosed robotic apparatus, workplace management can be made more efficient, cost-effective, and safer. Worker or staff injuries can be significantly reduced. Work-related physical stress and fatigue can also be significantly reduced. Unlike humans, the robotic apparatus can work for day and night, without any time restraints. Reliance on human staff can be reduced for multiple tasks, thus reducing operational costs. An increase in profits may help in increasing the proportion of higher-paying jobs and reduction in labor-intensive low-paying jobs. Industries can become more tech-friendly and bring in more projects thus significantly improving industrial productivity and growth.

Figure 2:
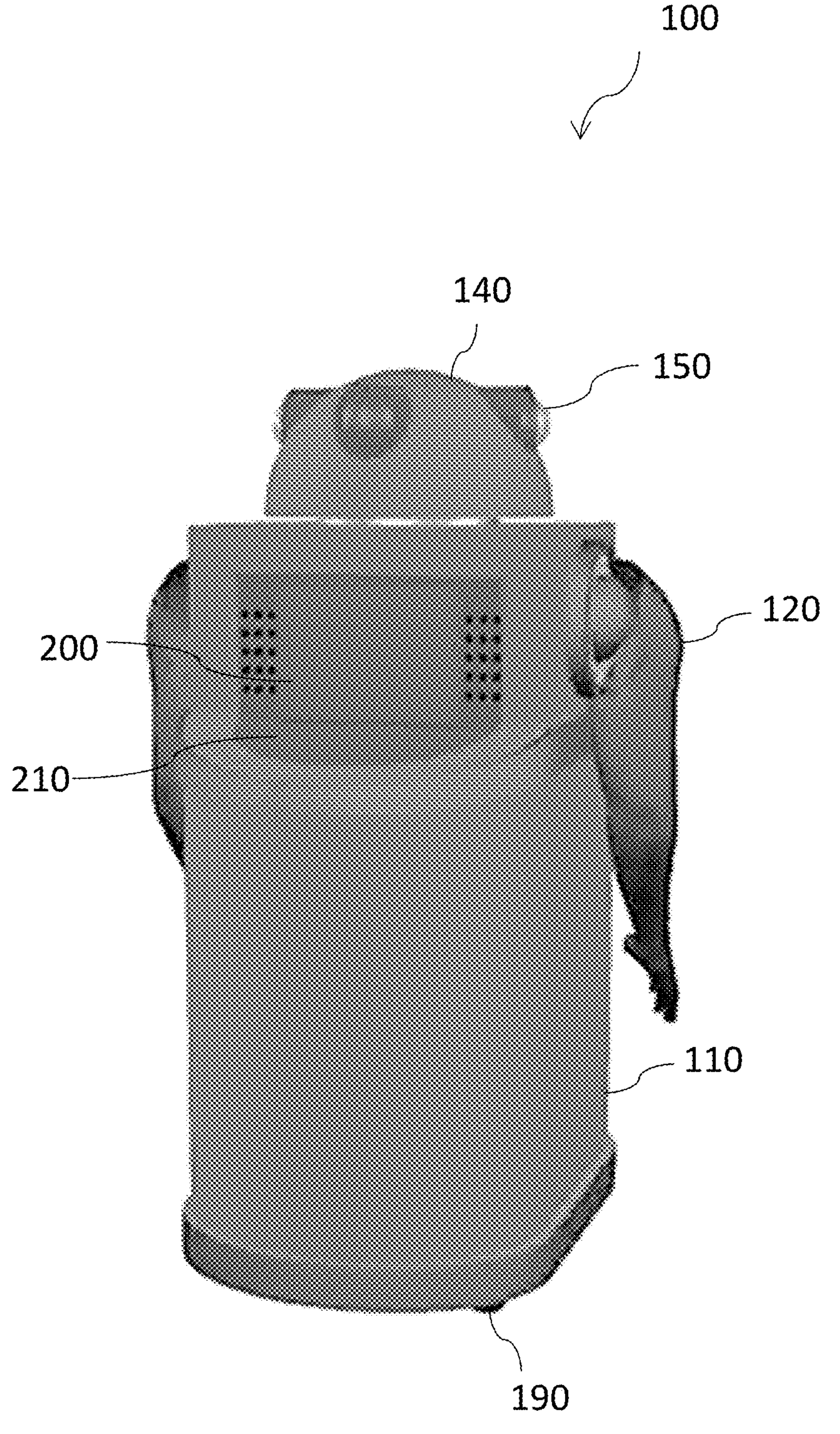
FIG. 2 is a rear and side perspective view of the robotic apparatus, according to an exemplary embodiment of the present invention.

Referring to FIGS. 1 and 2 which show perspective views of the disclosed robotic apparatus 100. The robotic apparatus can include a robotic body 110, a base 115, robotic arms 120, robotic arms have robotic hands 130, a robotic head 140, the robotic head as multiple cameras 150 with computer vision technologies, a front display 160, a front input device 170, a call receiver 180, the base has wheeled platform 190, a rear display 200, a rear input device 210, and a neck 220 which couples the robotic head to the robotic body.

The base includes a set of wheels over which the robotic apparatus can move in any direction and rotate 360 degrees. The base makes the disclosed robotic apparatus versatile and quick. The robotic body of the robotic apparatus is mounted over the base. The robotic body is elongated and encases different components of the robotic apparatus. The height of the robotic apparatus may match the height of a standard person, such as between 4.5 and 6.5 feet. It is also to be noted that the extendible neck may allow changing the height of the robot from 4.5 to 6.5 inches.

The robotic apparatus includes two robotic arms operably coupled to the robotic body and each robotic arm has a robotic hand. The robotic arms and robotic hands are coupled using multiple joints for multiple degrees of freedom. Like a human hand, the disclosed robotic apparatus can pick, grab, and carry objects in its robotic hands. The disclosed robotic apparatus can do most of the tasks done by human hands and can do more because of the machine's strength and precision, and additionally having more degrees of freedom. The hands can have different attachments useful for the specific work assigned to the robotic apparatus, for example, forklift kind of hand attachments to lift and move objects.

The disclosed apparatus can use computer vision as eyes, wherein multiple cameras can be mounted to the head of the robotic apparatus. In a preferred implementation, the disclosed apparatus can have four cameras mounted to the head for a 360-degree view of the surroundings. However, one to four cameras are within the scope of the present invention. The four cameras can be equally spaced from each other, such as at 90 degrees from each other. However, any other arrangement of the cameras is within the scope of the present invention. For example, the two cameras can be on the front side and the two cameras can be on the rear side of the robotic head. Also, one camera in front and one on rear side can be used which in synchronization can cover most of the surroundings. Besides the use of computer vision, the disclosed robotic apparatus may also include other sensors, such as infrared sensors, LIDAR technologies, proximity sensors, and the like to better construct and understand the surrounding environment.

The robotic head can be mounted to the robotic body using an extensible neck, for example, a telescoping neck. The height of the robotic head relative to the robotic body can be increased or decreased by the disclosed robotic apparatus. For example, robotic apparatus can view across any barrier such as the wall of a cubicle by lifting its robotic head. It is understood that the robotic head can be lifted incrementally to a desired height.

The disclosed apparatus can be used to monitor any job site. Also, the disclosed apparatus can provide for two-way audio and video conferencing. A suitable display, such as an LED can be provided on both the front side and rear side of the robotic body as shown in FIGS. 1 and 2. The display may present instructions, information, and the like to users. The display may also allow a user to perform video conferencing. For example, the robotic apparatus may allow a team to perform video conferencing with their supervisor, clients, or any person. The provision of displays on both sides is advantageous in that displays are visible to all people surrounding the disclosed robotic apparatus. For example, the robotic apparatus may stand in the center of a workspace, and employees around the robotic apparatus can view the display. The use of multiple cameras on the head can capture a 360-degree view of the robotic apparatus. Input from multiple cameras can be joined by the robotic apparatus, like a panoramic image, and the user on the other side of the video conference may thus see the entire area surrounding the robotic apparatus in a single view. The other person can see the whole team around the robotic apparatus on a single screen. The robotic apparatus may also include one or more microphones to capture voices for audio and video conferencing. The robotic apparatus may also allow listening to any environmental sound. The disclosed robotic apparatus may be configured to capture specific or focused sounds. For example, when a person is speaking to the disclosed robotic apparatus, the robotic apparatus can cancel any environmental or surrounding noises or sounds so that the clear voice of the person can be received by the robotic apparatus.

The robotic apparatus can include a control unit, motors, and other circuitry known for use in robots. The control unit can include one or more processors that may support artificial intelligence and computer vision. The control unit may also include memory for storing instructions, programs, software, and the like. The control unit may also include suitable language translation models that may help the disclosed robotic apparatus to understand what a user is saying, understand different languages, as well as translate the language for another user, so that the two can talk.

In certain implementations, the robotic apparatus can bend, sit, or squat like a human. This may allow the robotic apparatus to perform various human laborious tasks in a workspace easily mimicking humans. This may make instructing the robotic apparatus for tasks easier. The robotic apparatus may also include a miniature forklift cart or similar attachment to assist in some working assignments. Walking is a lot slower than riding. The wheeled base can enhance efficiency in assembly lines, office moving, moving furniture, and the like, wherein the wheeled base is faster than walking.

The robotic apparatus, although having a wheeled base, can walk on two legs, like humans. In security monitoring, low speed of wheeled base or walking might be more suitable. The miniature forklift attachment can be more helpful in moving and industrial heavy work. As explained above, the height of the robotic apparatus can be up to the height of a tall person, as the robotic apparatus like humans must fit in doors, and elevators and navigate through aisle ways.

Figure 3:
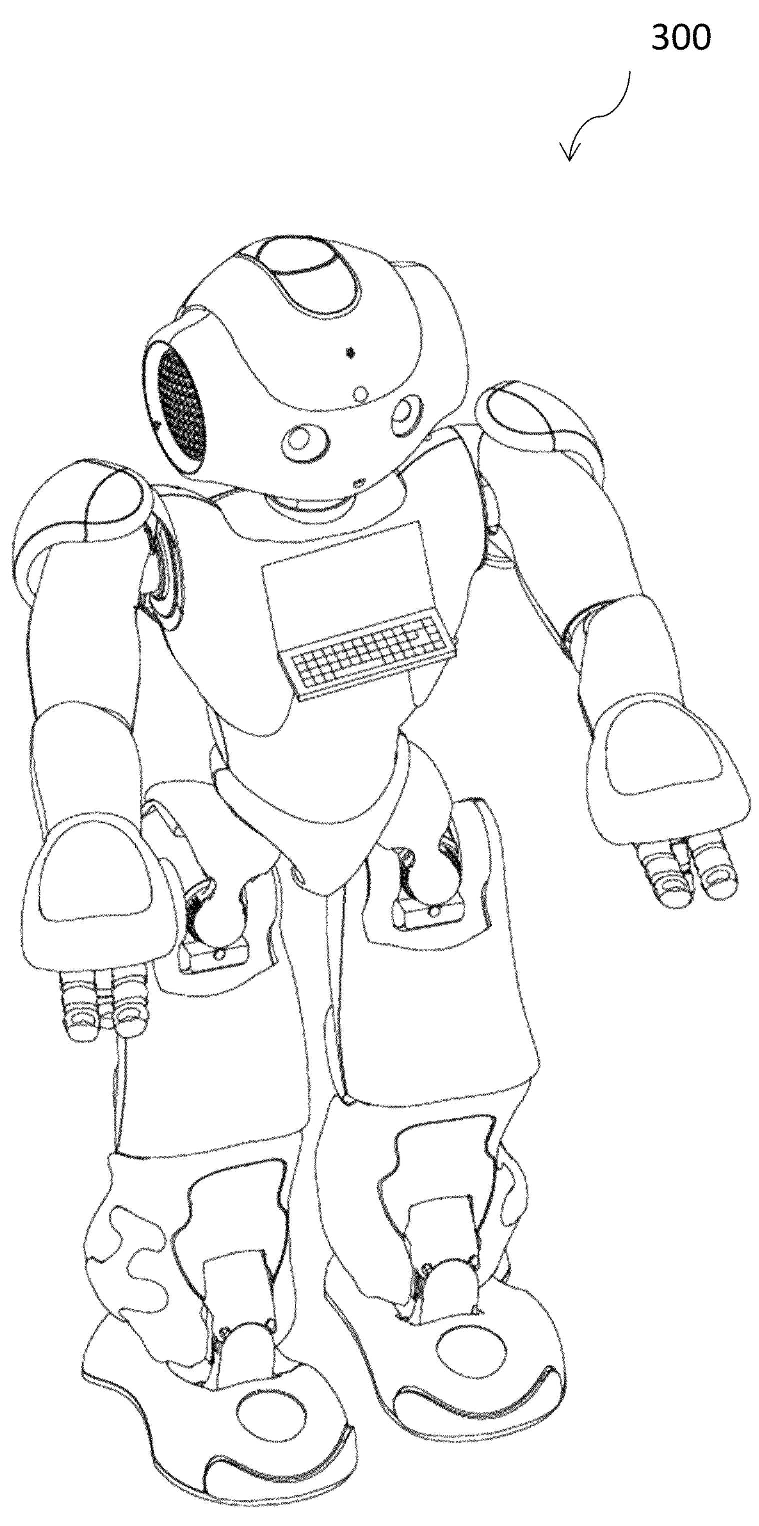
FIG. 3 shows another embodiment of the robotic apparatus, according to an exemplary embodiment of the present invention.

The legs of the robotic apparatus can bend like human legs. FIG. 3 shows the apparatus that has features like a human bending of hands and legs. The robotic apparatus shown in FIG. 3 may have features as described above for the robotic apparatus shown in FIG. 2. Two to four cameras can be mounted in the head for a wide to 360-degree view. The hand attachments can assist with leverage and lifting. The feet can be a power wheel foot system for power moving. The wheels can be big enough to support pushing and pulling on multiple surfaces with no scuff wheels. The head can have a screen, or the screen can be provided anywhere or at more than one location.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A robotic apparatus comprising:

a robotic body;

a base over which the robotic body is mounted, the base has a plurality of wheels configured to allow the robotic apparatus to move and rotate;

a robotic head;

an extensible neck extending between the robotic body and the robotic head, the robotic apparatus is configured to increase or decrease the effective length of the extensible neck, wherein the robotic head is rotatably mounted to the extensible neck; and a pair of robotic arms coupled to the robotic head, wherein each robotic arm has a robotic hand;

wherein the robotic apparatus further comprises:

a front display mounted to a front side of the robotic body;

a front input device mounted to the front side of the robotic body;

a rear display mounted to a rear side of the robotic body; and a rear input device mounted to the rear side of the robotic body.

2. The robotic apparatus according to claim 1, wherein the robotic apparatus further comprises a plurality of cameras disposed in the robotic head, the plurality of cameras support computer vision.

3. The robotic apparatus according to claim 1, wherein the robotic apparatus further comprises a control unit, the control unit comprises one or more processors and memory, the control unit is configured with artificial intelligence, computer vision, and building automation system (BAS) technologies.

4. The robotic apparatus according to claim 1, wherein the robotic apparatus further comprises:

a call receiver unit mounted adjacent to the front display.

5. The robotic apparatus according to claim 1, wherein the robotic apparatus is configured to lift an object by the robotic hands, transport the object, and place the object.

6. The robotic apparatus according to claim 2, wherein the plurality of cameras comprises four cameras, the four cameras equally spaced apart from each other.

7. The robotic apparatus according to claim 3, wherein the control unit is configured with a building plan and layouts of a workplace.

8. The robotic apparatus according to claim 5, wherein the object comprises office equipment.

* * * * *